UNITED STATES PATENT OFFICE.

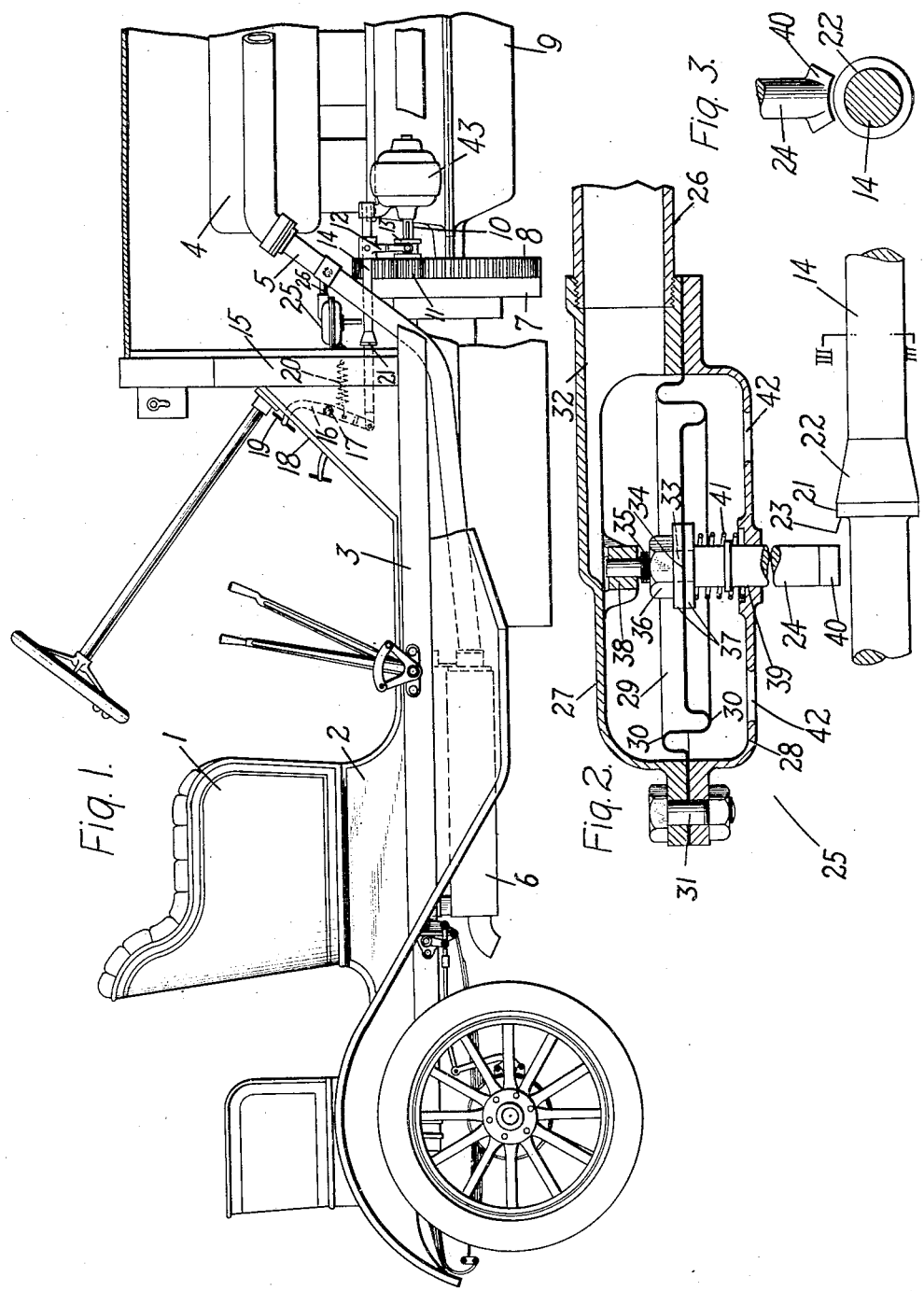

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

SAFETY DEVICE FOR STARTING-MOTORS.

1,130,675.

Specification of Letters Patent. Patented Mar. 2, 1915.

Application filed March 7, 1913. Serial No. 752,617.

*To all whom it may concern:*

Be it known that I, CHESTER B. MILLS, a citizen of the United States, and a resident of East McKeesport, in the county of Allegheny and State of Pennsylvania, have invented a new and useful Improvement in Safety Devices for Starting-Motors, of which the following is a specification.

My invention relates to safety devices for starting motors and it has for its object to provide a simple structure for preventing the connection of the starting motor to the engine shaft of an automobile or motor vehicle while the engine is running under its own power.

It is a common practice to provide gas engine driven vehicles with suitable starting motors, which are, ordinarily, dynamo-electric machines. Gearing is usually employed to connect the motor to the engine shaft and, in most cases, the gears are placed in mesh by a hand or foot-operated lever or pedal. It may happen, after the engine has been started, or during the operation of the vehicle, that the operator, through accident or mistake, may attempt to mesh the connecting gears. Since the minimum speed of a gas engine is relatively high, any attempt to mesh the gears while one of them is rotating at a high speed will more than likely result in the breaking of the gear teeth.

For the above reasons, it is desirable that a means be provided for preventing the operation of the starting pedal when the engine is running under its own power at any speed.

My invention provides a mechanical lock which prevents the operation of the starting pedal after the engine has been started and the motor disconnected.

In the drawings, Figure 1 is a side view of a portion of an automobile with my invention attached thereto. Fig. 2 is an enlarged view, in section, of a safety device. Fig. 3 is a view, in section, taken on line III—III of Fig. 2.

Referring to Fig. 1, the automobile 1 comprises a body 2, a frame 3, an engine 4 having an exhaust pipe 5 leading to a muffler 6, and a fly wheel 7 provided with a gear 8. An electric motor 43 is supported in any suitable manner upon the frame 3 or upon the crank case 9 of the engine, and is provided with a shaft 10 upon which a pinion 11 is slidably keyed to mesh with the fly wheel gear 8. A yoke member 12 engages a grooved collar 13 that is integral with the pinion 11 and is actuated by a slidably mounted rod 14 which extends through the dashboard 15 and is connected to a pedal 16 having a pivotal support at 17 and extending through a suitable opening in the floor 18 and provided with a member 19 adapted to be pressed by the foot of the operator. A spring 20 is attached to the pedal and to a stationary part and normally holds the rod 14 in a forward position, with the pinion 11 out of mesh with the fly wheel gear 8. The rod 14 has a shoulder 21 having an inclined side 22 and a side 23 that is normal to the rod and is adapted to be engaged by the stem 24 of a fluid pressure device 25 connected to the exhaust pipe 5 by a pipe 26 and supported by the dashboard.

The device 25 is shown in detail in Fig. 2. The casing is composed of two cup shaped members 27 and 28 between which is placed a thin sheet metal diaphragm 29 having corrugations 30, the three members being clamped together by bolts, one being shown at 31. The member 27 is connected to the pipe 26 by a tubular extension 32 through which connections fluid pressure may be transmitted from the exhaust pipe to the diaphragm 29. The stem 24 has a reduced portion 33 which passes through a central opening 34 in the diaphragm 29 and is threaded at 35 to receive a nut 36 for clamping the stem and diaphragm tightly together by means of two washers 37 placed on the respective sides of the diaphragm.

The stem 24 is mounted to reciprocate in a bearing formed by a lug 38 on the inner surface of the member 27 and in a bearing formed by a central opening 39 in the member 28. The stem 24 is provided with a curved member 40 which is adapted to engage the shoulder 21 when the diaphragm is actuated by fluid pressure and which is normally held out of engagement therewith by a spring 41 inside the casing. The member 28 is provided with openings 42 to allow the free passage of air in order to prevent any back pressure of the diaphragm.

When the operator desires to start the engine, the pedal 16 is pressed forward and the rod 14 and the yoke member 12 are actuated backwardly to slide the pinion 11 into mesh with the fly wheel gear 8, the parts taking the position shown in Fig. 1.

The stem 24 allows the shoulder 21 to pass without engagement as no pressure is exerted upon the diaphragm 29 when the engine is at rest. The motor circuit is closed through any suitable electrical connections, and the engine is started in the usual way. As soon as the explosions of the engine commence, pressure will be communicated to the diaphragm 29 and the stem 24 will be projected into the path of the shoulder 21. When the operator releases the pedal 16, the spring 20 will reciprocate the rod 14 to disengage the pinion 11 from the flywheel gear 8. During this movement, the inclined side 22 of the shoulder 21 will exert a wedging action on the stem 24 and push it upward until the shoulder has passed when the stem will again drop into a position to engage the side 23. The rod 14 is now positively locked against movement to mesh the gears as long as explosions take place, as the diaphragm is provided with an area sufficient to insure its operation at the minimum pressure of the exhaust pipe when the muffler 6 is cut out. When the engine stops and no pressure is communicated to the diaphragm, the spring 41 will hold the stem 24 in its upward position and the rod 14 may again be reciprocated to connect the motor to the engine shaft.

When the engine is running without explosions as, for example, when the vehicle is coasting down a hill with the clutch connected and the ignition circuit broken, the cylinders act as air pumps and create a pressure in the exhaust pipe sufficiently high to operate the safety device.

While I have shown and described the diaphragm as connected to the exhaust pipe, it may be applied to any other portion of the engine structure, such as the cooling pump and crank case, in which pressure is generated continuously during the operation of the engine.

I claim as my invention:—

1. In combination, an engine having a shaft, a starting motor, means for operatively connecting said motor to said engine shaft, and means operated by fluid pressure for locking said connecting means in a disengaged position when said engine is operating under its own power.

2. In combination, an engine having a shaft, a starting motor, means for operatively connecting said motor to said engine, and a device actuated by fluid pressure generated by said engine for locking said connecting means in a disengaged position.

3. In combination, an engine shaft, a starting motor, means for operatively connecting said motor to said shaft, and means actuated by fluid pressure for preventing the connecting of said motor to said shaft when the engine is running under its own power.

4. In combination, an engine shaft, a starting motor, means for operatively connecting said motor to said shaft, and means actuated by fluid pressure to prevent the actuation of said first means to connect said motor to said shaft when the engine is operating under its own power.

5. In combination, an engine having a shaft, a starting motor, gearing mechanism for connecting said motor to said shaft and means actuated by fluid pressure for preventing the meshing of said gearing mechanism when the engine operates under its own power.

6. In combination, an engine having a shaft, a gear member on said shaft, a starting motor, a pinion adapted to operatively connect said motor to said gear member and a device actuated by fluid pressure for preventing the engagement of said pinion with said gear member when the engine operates under its own power.

7. In combination, an engine having a shaft and an exhaust pipe, a starting motor adapted to be operatively connected to said shaft, and a device actuated by fluid pressure from said exhaust pipe and adapted to prevent the connection of said motor to said shaft when said engine is operating under its own power.

8. In combination, an engine having a shaft and an exhaust pipe, a starting motor, means for operatively connecting said motor to said shaft, and a member adapted to be actuated by fluid pressure from said exhaust pipe for preventing the connection of said motor to said shaft when the engine is operating under its own power.

9. In combination, an engine having a shaft and an exhaust pipe, a motor, a slidably mounted shaft adapted to operatively connect said motor to said shaft, a diaphragm adapted to be actuated by fluid pressure from said exhaust pipe, and a member connected to said diaphragm and adapted to engage said slidable shaft.

10. In combination, an engine having a shaft, a starting motor, means for operatively connecting said motor to said shaft, and means actuated by fluid pressure for preventing the actuation of said first means to connect the motor to said shaft when the engine shaft is rotating.

In testimony whereof, I have hereunto subscribed my name this 27th day of February, 1913.

CHESTER B. MILLS.

Witnesses:
RAOUL PRUGGER,
B. B. HINES.